(12) United States Patent
Liang et al.

(10) Patent No.: US 8,493,337 B2
(45) Date of Patent: Jul. 23, 2013

(54) LIGHT TRANSMISSION TOUCH PANEL

(75) Inventors: Hsuan Han Liang, Hsinchu County (TW); Chih Yen Lee, Hsinchu County (TW)

(73) Assignee: Ritfast Corporation, Hsinchu (TW)

( * ) Notice: Subject to any disclaimer, the term of this patent is extended or adjusted under 35 U.S.C. 154(b) by 1254 days.

(21) Appl. No.: 12/335,195

(22) Filed: Dec. 15, 2008

(65) Prior Publication Data
US 2010/0073310 A1   Mar. 25, 2010

Related U.S. Application Data

(60) Provisional application No. 61/098,997, filed on Sep. 22, 2008.

(51) Int. Cl.
  *G06F 3/041* (2006.01)
(52) U.S. Cl.
  USPC ........................................... 345/173
(58) Field of Classification Search
  USPC .............. 349/12, 139, 143; 178/18.03, 18.06, 178/18.01; 345/173, 174
  See application file for complete search history.

(56) References Cited

U.S. PATENT DOCUMENTS

| 6,188,391 | B1 * | 2/2001 | Seely et al. | 345/173 |
| 2007/0273560 | A1 * | 11/2007 | Hua et al. | 341/33 |
| 2008/0264699 | A1 * | 10/2008 | Chang et al. | 178/18.01 |
| 2008/0309635 | A1 * | 12/2008 | Matsuo | 345/173 |
| 2009/0160824 | A1 * | 6/2009 | Chih-Yung et al. | 345/175 |
| 2009/0277695 | A1 * | 11/2009 | Liu et al. | 178/18.03 |

* cited by examiner

*Primary Examiner* — Dung Nguyen
*Assistant Examiner* — Tai Duong
(74) *Attorney, Agent, or Firm* — WPAT, P.C.; Anthony King

(57) ABSTRACT

A light transmission touch panel comprises a transparent substrate, a transparent conductive layer, an insulating layer, a plurality of first metal lines, and a plurality of second metal lines. The transparent conductive layer is overlaid on a surface of the transparent substrate and comprises a plurality of first cells, a plurality of second cells and a plurality of connecting lines, wherein the plurality of first cells and the plurality of second cells are arranged in a staggered manner and the plurality of connecting lines respectively connect the adjacent second cells. The insulating layer further comprises a plurality of insulating areas, each of which is overlaid on one of the first cells. The plurality of second metal lines are respectively disposed on the connecting lines. The plurality of first metal lines are respectively disposed on the plurality of insulating areas, and respectively connect the adjacent first cells.

5 Claims, 13 Drawing Sheets

LIGHT TRANSMISSION TOUCH PANEL

BACKGROUND OF THE INVENTION

1. Field of the Invention

The present invention relates to a light transmission touch panel, and more particularly, to a touch panel having capacitance circuits.

2. Description of the Related Art

Touch panels have been widely applied in the fields of household appliances, communications, and electronic information devices. Common applications of the touch panel include an input interface of a personal digital assistant (PDA), an electrical appliance, a game machine, etc. The current trend of integration of touch panel and display panel allows a user to use his or her finger or a stylus to indicate a control icon shown on the panel in order to execute a desired function on a PDA, an electrical appliance, a game machine, etc. The touch panel is also applied in public information inquiry systems to provide an efficient operation system for the public.

A conventional touch panel comprises a transparent substrate having a surface on which sensing zones are distributed for sensing a signal associated with the touch of a user's finger or stylus to effect input and control. The sensing zones are made of transparent conductive membranes, such as Indium Tin Oxide (ITO), and a user may touch the transparent conducive membrane corresponding to a specific location shown on the display to effect operation of the device.

In order to detect the location where a finger or a stylus touches the touch panel, a variety of capacitive touch panel techniques are developed. As shown in FIG. 1A, a touch panel 10 comprises a substrate 11, a first transparent conductive layer 12, an insulation layer 13 and a second transparent conductive layer 14. The first transparent conductive layer 12 is patterned and formed on the transparent substrate 11 by a photolithography process, and includes the plurality of first cells 121 and a plurality of first wires 122 longitudinally connecting first cells 121 that are aligned. The insulation layer 13 is overlaid on the first transparent conductive layer 12 and substrate 11. The patterned second transparent conductive layer 14 is overlaid on the insulation layer 13, and comprises a plurality of second electrode cells 141 and a plurality of second wires 142 transversely connecting the second cells 141 that are aligned. A plurality of connection wires 143 are disposed on a side of the insulation layer 13, whereby each chain of the second cells 141 transversely connected turns toward the bus end of the first leads 122.

FIG. 1B is a cross-sectional diagram along line 1-1 in FIG. 1A. The first transparent conductive layer 12 and second transparent conductive layer 14 are overlapped on the substrate 11, and the insulation layer 13 covers all of the area of the substrate 11. However, each of the first transparent conductive layer 12, the insulation layer 13 and the second transparent conductive layer 14 can absorb some amount of light so that a display with the touch panel 10 appears darker.

FIG. 2 is a cross-sectional diagram of another conventional touch panel. A touch panel 20 comprises a substrate 21, a first transparent conductive layer 22, a first insulation layer 23, a second transparent conductive layer 24, and a second insulation layer 25. The first insulation layer 23 is overlaid on a first transparent conductive layer 22 and the upper surface of the substrate 21, and has the second insulation layer 25 overlaid on a second transparent conductive layer 24 and the lower surface of a substrate 21.

Compared with the touch panel 10 in FIG. 1B, the touch panel 20 needs to be processed on both sides of the substrate 21. Therefore, some issues such as scratch, exposure and ITO etching occur during the specified processes. In addition, the additional second insulation layer 25 can also absorb some light which causes reduced transmittance.

Thus, it is desired to have a touch panel that overcomes the above drawbacks of the conventional touch panels.

SUMMARY OF THE INVENTION

An aspect of the present invention is to provide a light transmission touch panel with high transmittance. The electrode cells with different polarities of the touch panel are formed during the same process, and do not overlap each other. Furthermore, the total area of the insulation layer of the touch panel covering the substrate is minimized. Therefore, the touch panel has high transmittance due to its simplified structure.

Another aspect of the present invention is to provide a light transmission touch panel with protection against electrostatic discharge (ESD). A plurality of assistant metal lines are disposed on the wires connecting cells or in place of those wires. Because the assistant metal lines can carry a large current, the high-resistance wires are prevented from damage due to overcharge.

In view of above, the present invention discloses a light transmission touch panel which comprises a transparent substrate, a transparent conductive layer, an insulating layer, and a plurality of bridging lines. The transparent conductive layer is overlaid on a surface of the transparent substrate and comprises a plurality of first cells, a plurality of second cells and a plurality of connecting lines, wherein the plurality of first cells and the plurality of second cells are arranged in a staggered manner and the plurality of connecting lines respectively connect the adjacent second cells. The insulating layer further comprises a plurality of insulating areas respectively overlaid on the plurality of connecting lines. The plurality of bridging lines are respectively disposed on the plurality of insulating areas and respectively connect the adjacent first cells.

The present invention further discloses a light transmission touch panel which comprises a transparent substrate, a plurality of bridging lines, an insulating layer, and a transparent conductive layer. The plurality of bridging lines are overlaid on a surface of the transparent substrate. The insulating layer comprises a plurality of insulating areas which are respectively overlaid on the plurality of bridging lines. The transparent conductive layer is overlaid on the surface of the transparent substrate and comprises a plurality of first cells, a plurality of second cells and a plurality of connecting lines, wherein the plurality of first cells and the plurality of second cells are arranged in a staggered manner, the plurality of connecting lines respectively connect the adjacent second cells, and the plurality of bridging lines respectively connect the adjacent first cells.

The present invention further discloses a light transmission touch panel which comprises a transparent substrate, a transparent conductive layer, an insulating layer, a plurality of first metal lines, and a plurality of second metal lines. The transparent conductive layer is overlaid on a surface of the transparent substrate and comprises a plurality of first cells, a plurality of second cells and a plurality of connecting lines, wherein the plurality of first cells and the plurality of second cells are arranged in a staggered manner and the plurality of connecting lines respectively connect the adjacent second cells. The insulating layer further comprises a plurality of insulating areas, each of which is overlaid on and crosses one of the first cells. The plurality of second metal lines are respectively disposed on the connecting lines. The plurality of first metal lines are respectively disposed on the plurality of insulating areas, and respectively connect the adjacent first cells.

The present invention further discloses a light transmission touch panel which comprises a transparent substrate, a plurality of first metal lines, a plurality of second metal lines, an insulating layer, and a transparent conductive layer. The plurality of first metal lines and the plurality of second metal lines are overlaid on a surface of the transparent substrate. The insulating layer comprises a plurality of insulating areas respectively overlaid on the plurality of first metal lines. The transparent conductive layer is overlaid on the surface of the transparent substrate and comprises a plurality of first cells, a plurality of second cells and a plurality of connecting lines, wherein the plurality of first cells and the plurality of second cells are arranged in a staggered manner, the plurality of connecting lines are respectively disposed on the plurality of second metal lines and respectively connect the adjacent second cells, and the plurality of first metal lines respectively connect the adjacent first cells.

BRIEF DESCRIPTION OF THE DRAWINGS

The invention will be described according to the appended drawings in which.

PREFERRED EMBODIMENT OF THE PRESENT INVENTION

Figure 1A:
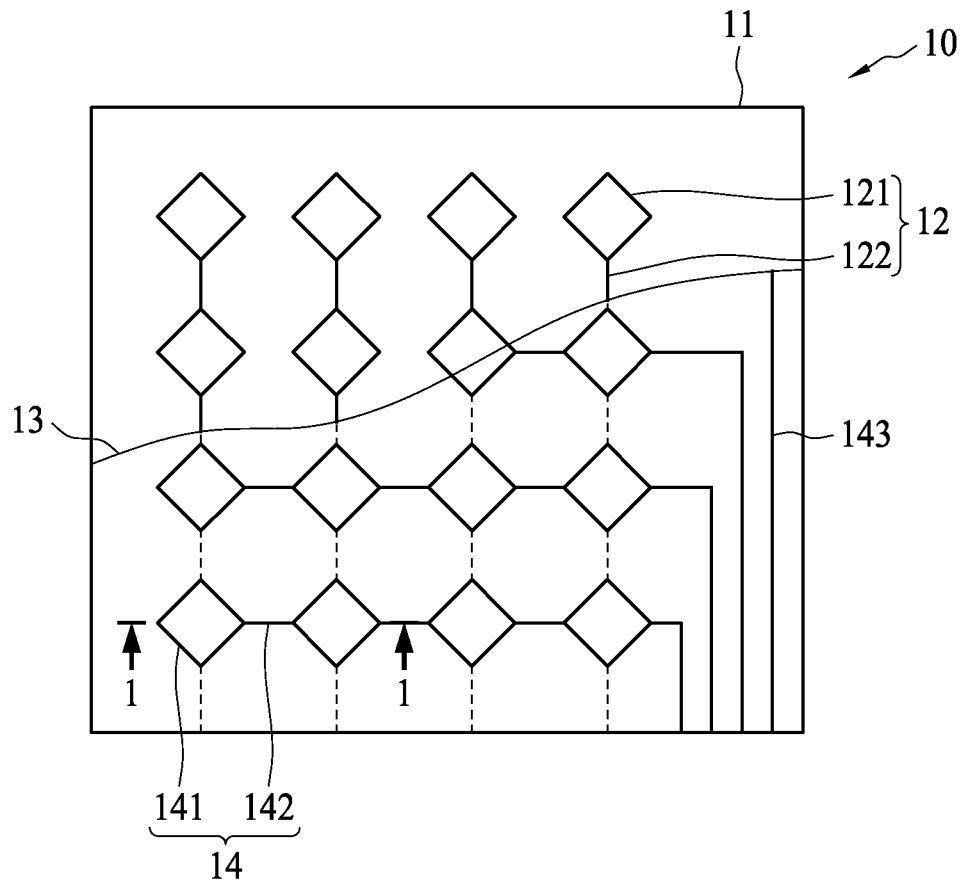
FIG. 1A is a schematic diagram of a conventional touch panel.
Figure 1B:
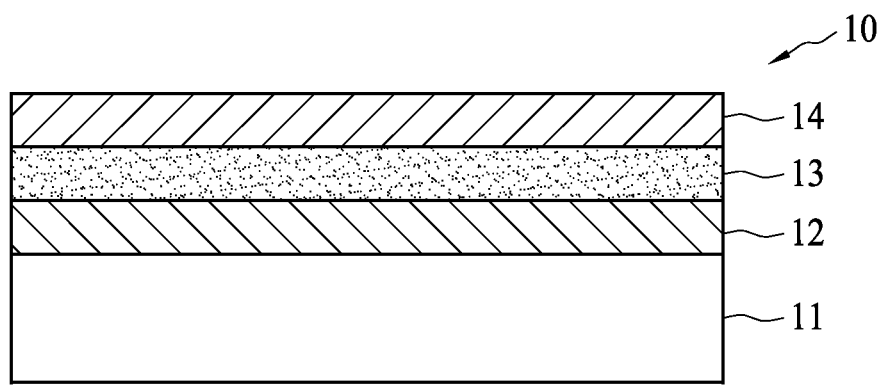
FIG. 1B is a cross-sectional diagram along line 1-1 in FIG. 1A.
Figure 2:
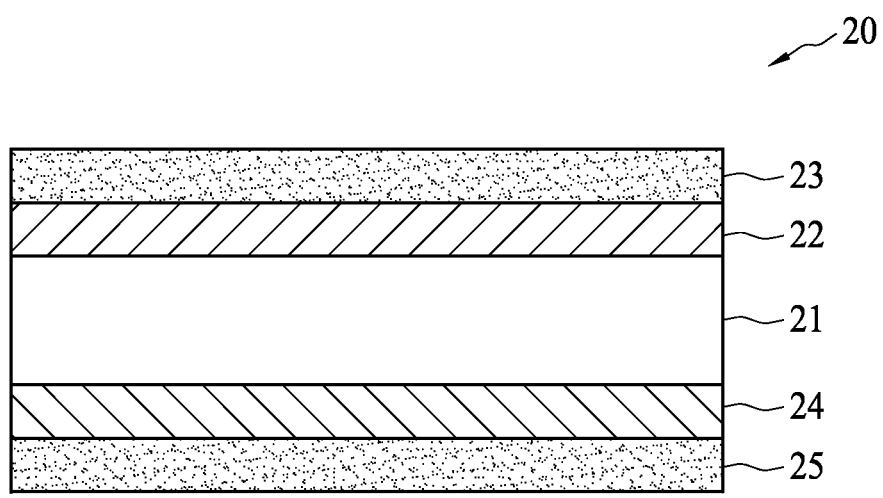
FIG. 2 is a cross-sectional diagram of another conventional touch panel.
Figure 3A:
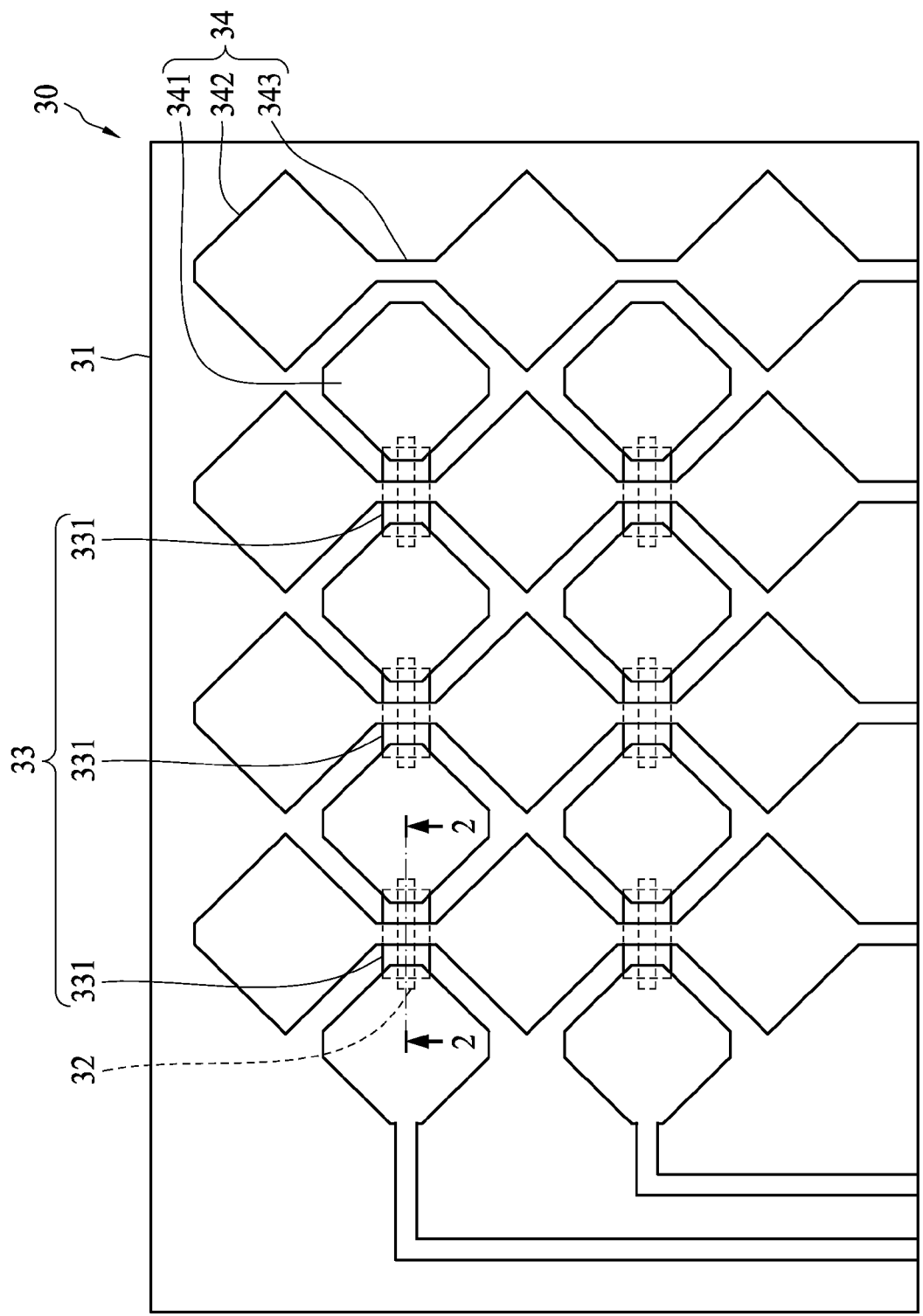
FIG. 3A is a schematic diagram of a touch panel in accordance with the present invention.

FIG. 3A is a schematic diagram of a touch panel in accordance with the present invention. As shown in FIG. 3A, a light transmission touch panel 30 comprises a transparent substrate 31, a plurality of bridging lines 32, an insulating layer 33, and a transparent conductive layer 34. The plurality of bridging lines 32 are overlaid on a surface of the transparent substrate 31. The insulating layer 33 comprises a plurality of insulating areas 331 which are respectively overlaid on the plurality of bridging lines 32. The two opposite ends of each of the bridging lines 32 are left uncovered by the patterned insulating layer 33. The transparent conductive layer 34 is overlaid on the surface of the transparent substrate 31, and comprises a plurality of first cells 341, a plurality of second cells 342 and a plurality of connecting lines 342 which are formed by a photolithography process. Furthermore, the plurality of first cells 341 and the plurality of second cells 342 are arranged in a staggered, lattice-like manner. Each of the plurality of connecting lines 342 respectively connects two adjacent second cells 342. Each of the plurality of bridging lines 32 respectively connects two adjacent second cells 342, and is formed by another photolithography process. In this embodiment, each of the bridging lines 32 follows the shortest path between the two adjacent first cells 341.

The materials of the transparent conductive layer 34 and bridging lines 32 is an indium-tin oxide (ITO), aluminum-zinc oxide (AZO) or indium-zinc oxide (IZO). The photolithography processes include sputter, coating, exposure, soft baking, hard baking, development, baking and other processes. The material of the transparent substrate 31 is glass or a transparent polymer plate such as polycarbonate (PC) and polyvinyl chloride (PVC). The material of the insulating layer 33 is a transparent polymer such as a photoresist material.

Figure 3B:
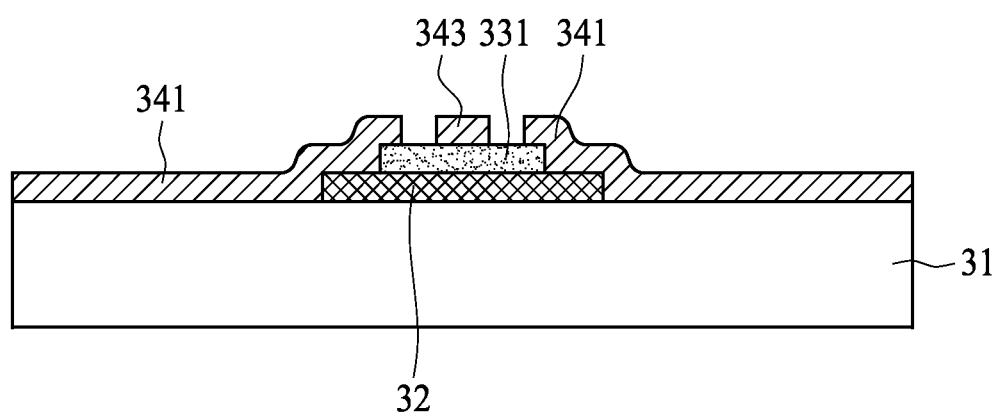
FIG. 3B is a cross-sectional diagram along line 2-2 in FIG. 3A.

FIG. 3B is a cross-sectional diagram along line 2-2 in FIG. 3A. The bridging line 32 and connecting line 343 are isolated from each other by the insulating area 331. The total area of the insulating layer 33 is minimized so that light transmittance is improved.

Figure 4A:
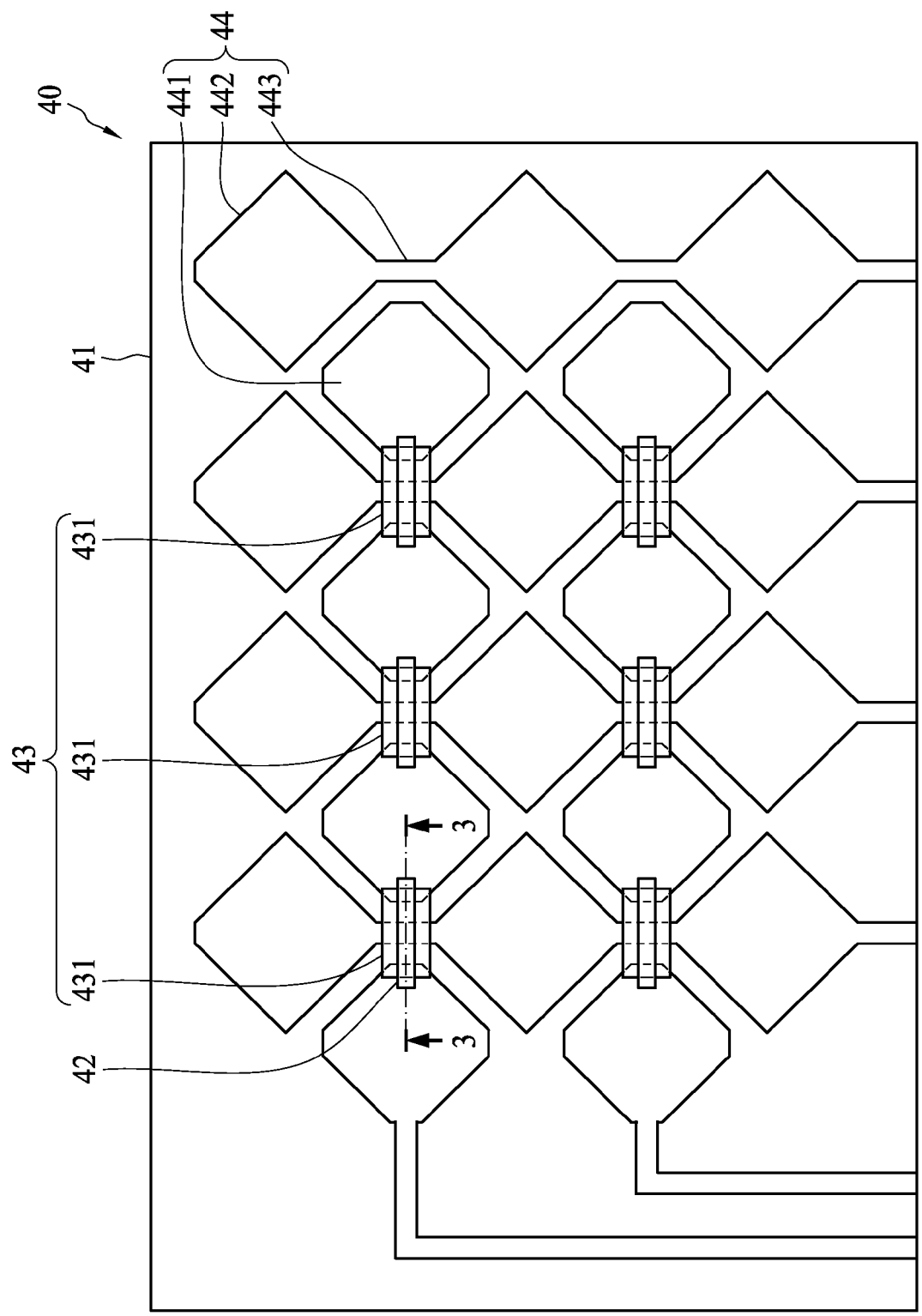
FIG. 4A is a schematic diagram of another touch panel in accordance with the present invention.

FIG. 4A is a schematic diagram of another touch panel in accordance with the present invention. A light transmission touch panel 40 comprises a transparent substrate 41, a plurality of bridging lines 42, an insulating layer 43, and a transparent conductive layer 44. The transparent conductive layer 32 is overlaid on the upper surface of the transparent substrate 41, and comprises a plurality of first cells 441, a plurality of second cells 442 and a plurality of connecting lines 443. The plurality of first cells 441 and the plurality of second cells 442 are arranged in a staggered manner, and each of the second cells 441 is surrounded by four second cells 442. Each of the plurality of connecting lines 443 respectively connects two adjacent second cells 442. The insulating layer 43 further comprises a plurality of insulating areas 431 which are respectively overlaid on the plurality of connecting lines 443. The plurality of bridging lines 42 respectively cross the plurality of insulating areas 431, and each connects two adjacent first cells 442.

Figure 4B:
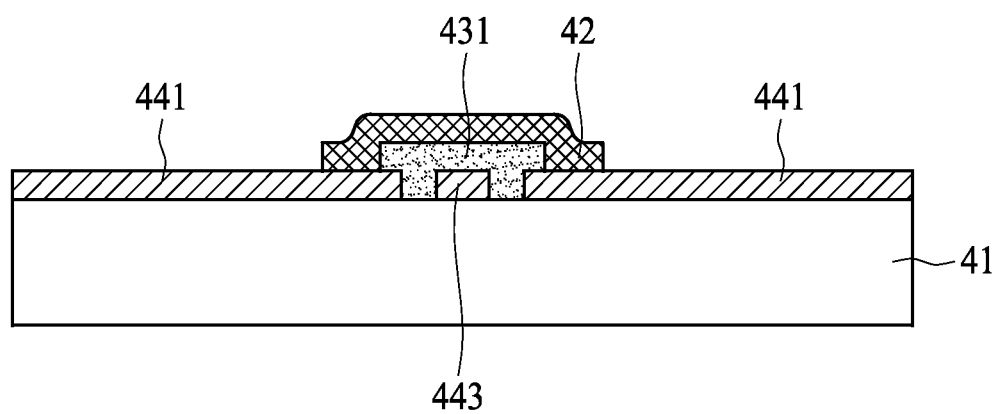
FIG. 4B is a cross-sectional diagram along line 3-3 in FIG. 4A.

FIG. 4B is a cross-sectional diagram along line 3-3 in FIG. 4A. The bridging line 42 and connecting line 443 are isolated from each other by the insulating area 331. The connecting line 443 is below the bridging line 42. In comparison with FIG. 3B, the connecting line 343 is above the bridging line 32.

Figure 5A:
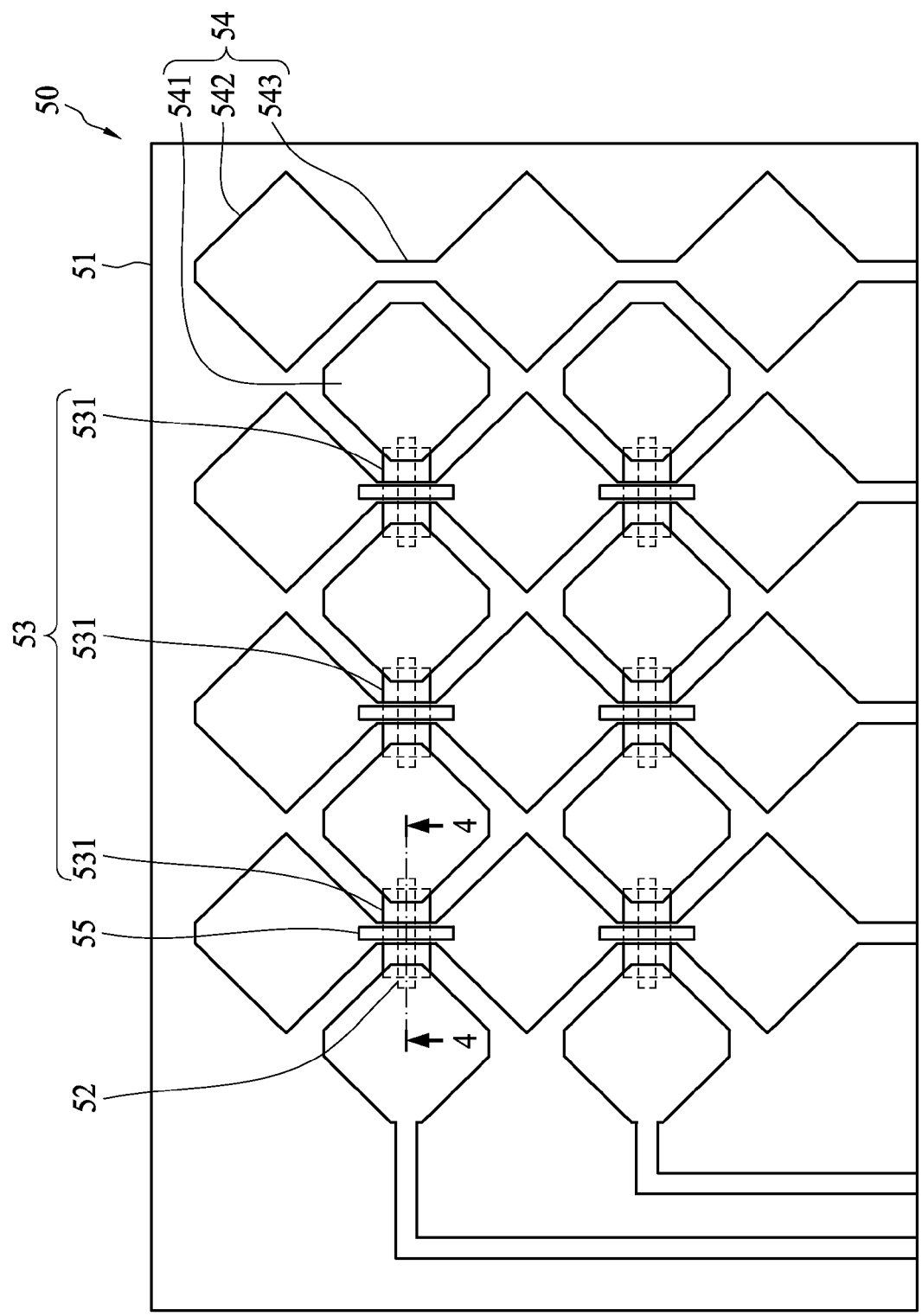
FIG. 5A is a schematic diagram of another touch panel in accordance with the present invention.

FIG. 5A is a schematic diagram of another touch panel in accordance with the present invention. A light transmission touch panel comprises a transparent substrate 51, a transparent conductive layer 54, an insulating layer 53, a plurality of first metal lines 52, and a plurality of second metal lines 55. The plurality of first metal lines 52 are disposed on the upper surface of the transparent substrate 51. The insulating layer 53 further comprises a plurality of insulating areas 531 respectively, each of which is overlaid on one of the first metal lines 52. The transparent conductive layer 54 is overlaid on the upper surface of the transparent substrate 51 and comprises a plurality of first cells 541, a plurality of second cells 542 and a plurality of connecting lines 543. The plurality of first cells 541 and the plurality of second cells 542 are arranged in a staggered manner, and each of the plurality of connecting lines 543 respectively connects two adjacent second cells 542. Each of the plurality of second metal lines 55 is disposed on one of the connecting lines 543. The material of the connecting lines 543 is an indium-tin oxide with high electrical resistance, but the second metal lines 55 overlaid on the connecting lines 543 have low electrical resistance. Therefore, each of the second metal lines 55 can carry a large current to protect the high-resistance wires from damage due to overcharge.

Figure 5B:
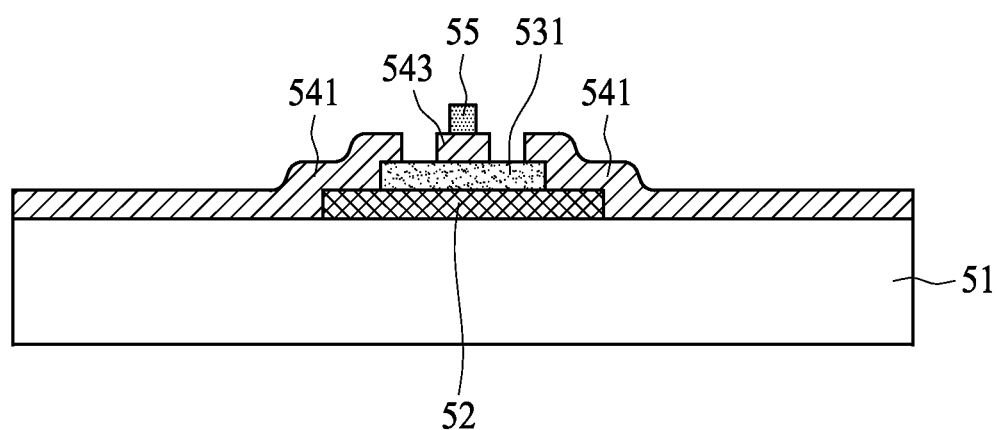
FIG. 5B is a cross-sectional diagram along line 4-4 in FIG. 5A.

FIG. 5B is a cross-sectional diagram along line 4-4 in FIG. 5A. The bridging line 52 and connecting line 543 are isolated from each other by the insulating area 531. The second metal lines 55 are stacked on the connecting line 543.

Figure 6A:
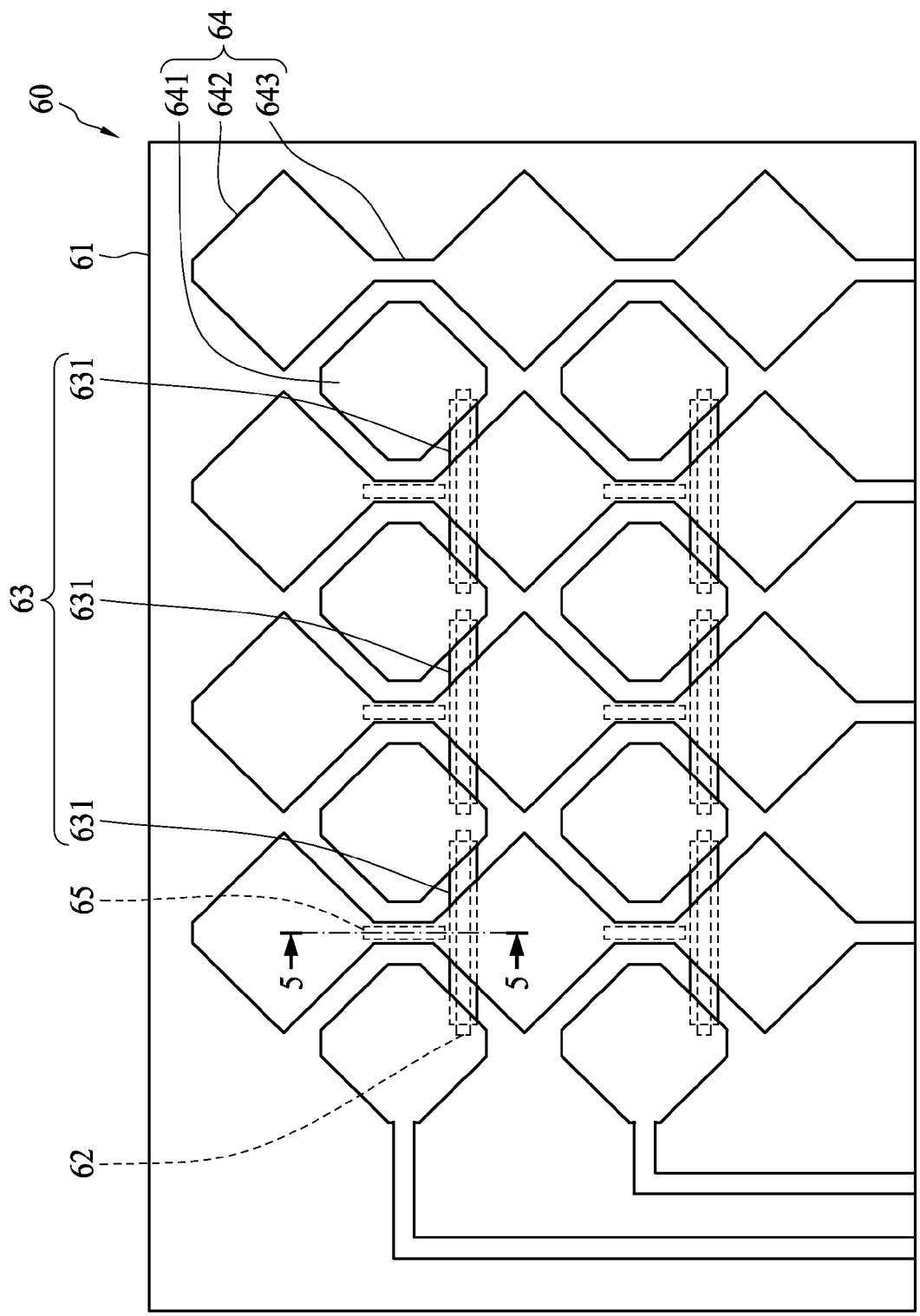
FIG. 6A is a schematic diagram of another touch panel in accordance with the present invention.

FIG. 6A is a schematic diagram of another touch panel in accordance with the present invention. A light transmission touch panel 60 comprises a transparent substrate 61, a plurality of first metal lines 62, a plurality of second metal lines 65, an insulating layer 63, and a transparent conductive layer 64. The plurality of first metal lines 62 and the plurality of second metal lines 65 are overlaid on the upper surface of the transparent substrate 61, and are separated from each other. The insulating layer 63 comprises a plurality of insulating areas 631, each of which is overlaid on one of the first metal lines 62. The transparent conductive layer 64 is overlaid on the surface of the transparent substrate 61, and comprises a plurality of first cells 641, a plurality of second cells 642 and a plurality of connecting lines 643. The plurality of first cells 641 and the plurality of second cells 642 are arranged in a staggered manner. Each of the plurality of connecting lines 643 is disposed on one of the plurality of second metal lines 62, and connects the adjacent second cells 642. Each of the plurality of first metal lines 62 connects two adjacent first cells 641.

Figure 6B:
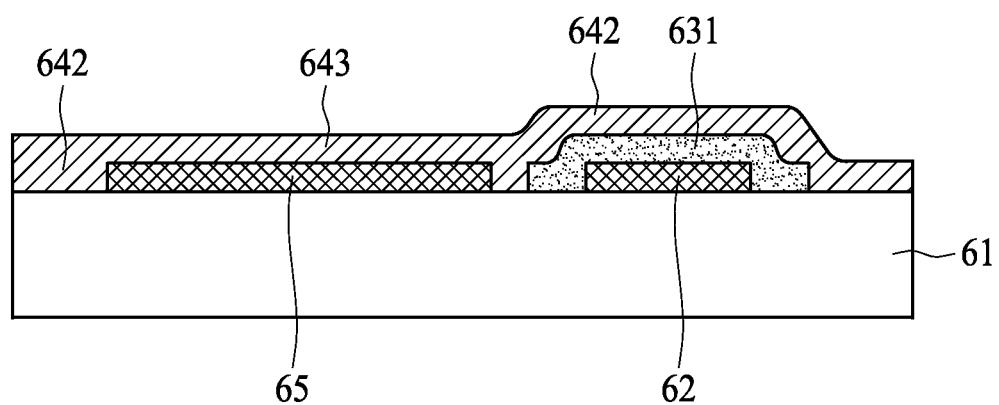
FIG. 6B is a cross-sectional diagram along line 5-5 in FIG. 6A.

FIG. 6B is a cross-sectional diagram along line 5-5 in FIG. 6A. The plurality of first metal lines 62 and plurality of second metal lines 65 are simultaneously formed on the transparent substrate 61 by a photolithography process, and are separated from each other. The connecting line 643 and the first metal line 62 are isolated from each other by the insulating area 631 of the insulating layer 63.

Figure 7A:
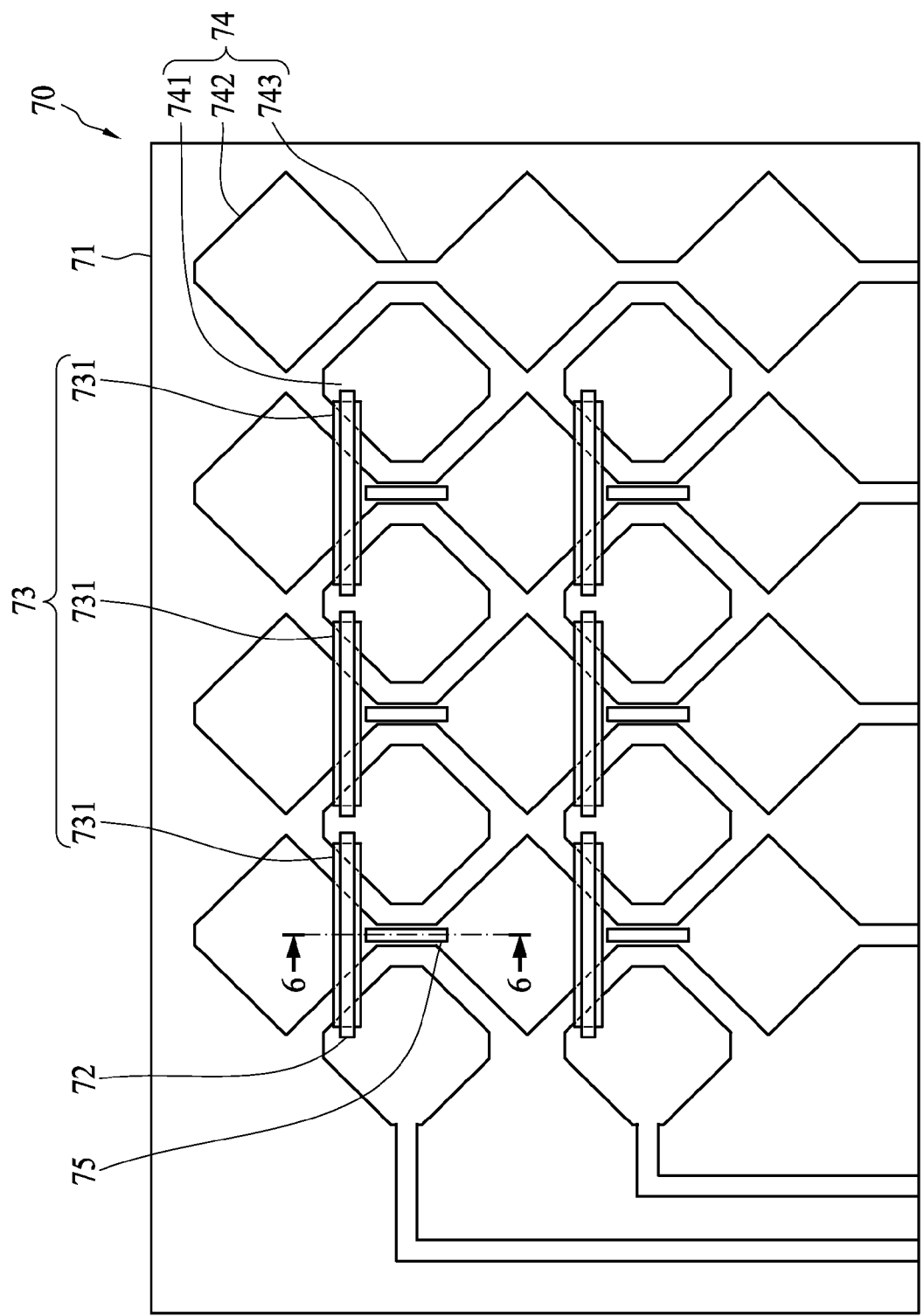
FIG. 7A is a schematic diagram of another touch panel in accordance with the present invention.

FIG. 7A is a schematic diagram of another touch panel in accordance with the present invention. A light transmission touch panel 70 comprises a transparent substrate 71, a transparent conductive layer 74, an insulating layer 73, a plurality of first metal lines 72, and a plurality of second metal lines 75. The transparent conductive layer 74 is overlaid on the upper surface of the transparent substrate 71, and comprises a plurality of first cells 741, a plurality of second cells 742 and a plurality of connecting lines 743. The plurality of first cells 741 and the plurality of second cells 742 are arranged in a staggered manner, and each of the plurality of connecting lines 743 connects two adjacent second cells 742. The insulating layer 73 further comprises a plurality of insulating areas 731, each of which is overlaid on one of the first cells 741 and two of the second cells 742 adjacent to the first cell 741. Each of the plurality of second metal lines 75 is disposed on one of the connecting lines 743. The plurality of first metal lines 72 are respectively disposed on the plurality of insulating areas 731, and each connects two adjacent first cells 741.

Figure 7B:
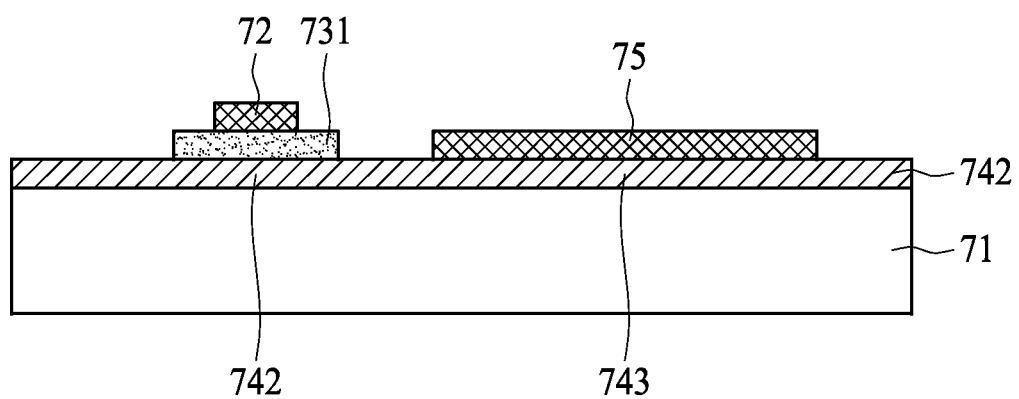
FIG. 7B is a cross-sectional diagram along line 5-5 in FIG. 7A.

FIG. 7B is a cross-sectional diagram along line 5-5 in FIG. 7A. The plurality of first metal lines 72 and plurality of second metal lines 75 are simultaneously formed on the transparent substrate 71, insulating areas 731 and transparent conductive layer 74 by a photolithography process, and are separated from each other. The connecting line 743 and the first metal line 72 are isolated from each other by the insulating area 731 of the insulating layer 73.

Figure 8A:
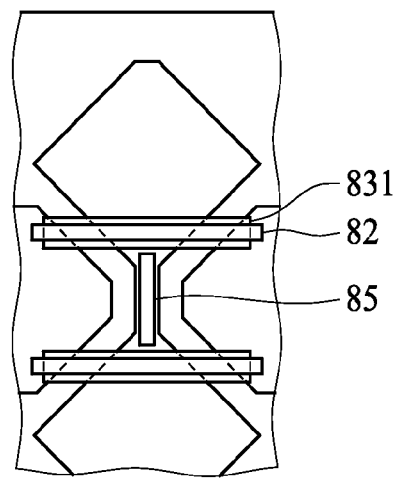
FIGS. 8A-8C are schematic diagrams of several touch panels in accordance with the present invention.

The first metal lines are not limited by the aforesaid embodiments, and can have several changes in their shapes and arrangements. As shown in FIG. 8A, there are a pair of first metal lines 82 sandwiching a second metal line 85. The first metal lines 82 are respectively disposed on corresponding insulating areas 831.

Figure 8B:
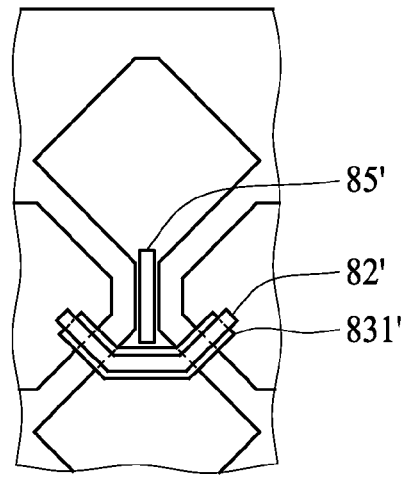
Figure 8C:
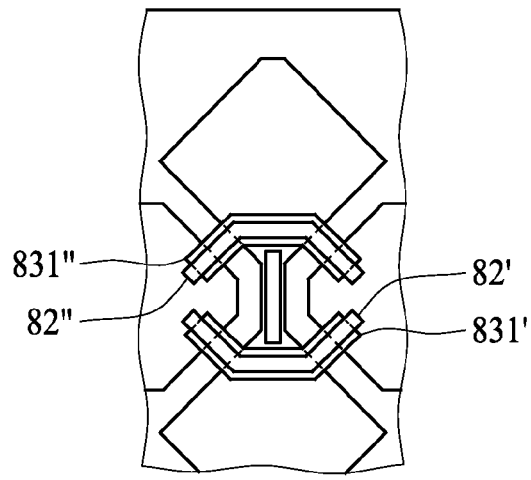

As show in FIG. 8B, the first metal line 82' has a tortuous path rather than a straight path. Similarly, the first metal lines 82' are respectively disposed on corresponding insulating areas 831' with a tortuous shape. Referring to FIG. 8C, another first metal line 82"overlaid on an insulating area 831' is opposite the first metal line 82', and they sandwich the second metal line 85.

The above descriptions of the present invention are intended to be illustrative only. Numerous alternative methods may be devised by persons skilled in the art without departing from the scope of the following claims.

What is claimed is:

1. A light transmission touch panel, comprising:
a transparent substrate;
a plurality of bridging lines overlaid on a surface of the transparent substrate;
an insulating layer comprising a plurality of insulating areas respectively overlaid on the plurality of bridging lines;
a transparent conductive layer overlaid on the surface of the transparent substrate and comprising a plurality of first cells, a plurality of second cells and a plurality of connecting lines, wherein the plurality of first cells and the plurality of second cells are arranged in a staggered manner, the plurality of connecting lines respectively connect adjacent pairs of the second cells, and the plurality of bridging lines respectively connect two of the plurality of first cells that are adjacent to each other; and
a plurality of second metal lines respectively and directly disposed on the plurality of connecting lines.

2. The light transmission touch panel of claim 1, wherein each of the bridging lines follows the shortest path between the two adjacent first cells.

3. The light transmission touch panel of claim 1, wherein the material of the bridging lines is conductive oxide or metal.

4. The light transmission touch panel of claim 1, wherein the material of the transparent conductive layer is conductive oxide.

5. The light transmission touch panel of claim 1, wherein the material of the transparent substrate is glass or transparent polymer.

* * * * *